United States Patent
Janzen (10) Patent No.: US 6,549,212 B1
(45) Date of Patent: Apr. 15, 2003

(54) SYSTEM FOR USER CUSTOMIZATION OF ATTRIBUTES ASSOCIATED WITH A THREE-DIMENSIONAL SURFACE

(75) Inventor: Ronald Janzen, Aurora (CA)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/116,237

(22) Filed: Jul. 16, 1998

(51) Int. Cl.[7] .............................................. G06T 15/00
(52) U.S. Cl. ..................................................... 345/581
(58) Field of Search ................................ 345/419, 433, 345/430, 113, 440, 441, 581, 619; 382/276

(56) References Cited

U.S. PATENT DOCUMENTS

| | | | | |
|---|---|---|---|---|
| 5,455,599 A | * | 10/1995 | Cabral et al. ................ | 345/440 |
| 5,617,114 A | * | 4/1997 | Bier et al. .................... | 345/413 |
| 5,687,304 A | * | 11/1997 | Kiss ............................. | 345/419 |
| 5,689,618 A | * | 11/1997 | Gasper et al. .............. | 395/2.85 |
| 5,701,403 A | * | 12/1997 | Watanabe et al. ........... | 345/419 |
| 5,790,708 A | * | 8/1998 | Delean ........................ | 382/276 |
| 5,819,092 A | * | 10/1998 | Furguson et al. ........... | 395/701 |
| 5,907,640 A | * | 5/1999 | Delean ........................ | 382/176 |
| 5,926,186 A | * | 7/1999 | Itoh et al. .................... | 345/433 |
| 5,977,982 A | * | 11/1999 | Lauzon ........................ | 345/430 |
| 6,006,230 A | * | 12/1999 | Ludwig et al. ............... | 707/10 |
| 6,329,990 B1 | * | 12/2001 | Silverbrook et al. ........ | 345/431 |

OTHER PUBLICATIONS

Pat Hanrahan et al., "Direct WYSIWYG Painting and Texturing on 3D Shapes", *Computer Graphics*, vol., 24, No. 4, Aug. 1990, pp. 215–223.

"Amazon Paint 3.0", http://www.ifx.com/spec_amazon.htm, Jun. 29, 1998.

"Amazon 3D Paint 3.0", http://www.ifx.com/spec_3Dpaint.htm, Jun. 29, 1998.

U.S. patent application Ser. No. 08/511,114, Picott et al., filed Aug. 1995.

* cited by examiner

*Primary Examiner*—Mark Zimmerman
*Assistant Examiner*—Huedung X. Cao
(74) *Attorney, Agent, or Firm*—Staas & Halsey LLP (57) ABSTRACT

The present invention is a system that allows a user to paint surface related attributes just like texture is painted. The painting actions are in the form of scripts that the user can provide and which are interpreted during painting.

6 Claims, 5 Drawing Sheets

SYSTEM FOR USER CUSTOMIZATION OF ATTRIBUTES ASSOCIATED WITH A THREE-DIMENSIONAL SURFACE

CROSS REFERENCE TO RELATED APPLICATION

This application is related to U.S. application Ser. No. 511,114, filed Aug. 4, 1995, entitled System and Method for Using Dependency Graphs for the Control of a Graphics Creation Process by Picott, et. al. and incorporated by reference herein.

BACKGROUND OF THE INVENTION

1. Field of the Invention

The present invention is directed to a system that allows a user to customize attributes associated with a three-dimensional (3D) surface and, more particularly, to a system that allows a user to provide scripts that are activated during painting to allow attributes associated with a 3D surface, such as geometry height, to be painted.

2. Description of the Related Art

Graphic artists who typically design and paint three-dimensional (3D) models are comfortable with the process of using a painting tool, such as a "brush," to paint color onto the surface of a model. Because of the ease of use and familiarity of artists with this technique, it is anticipated that artists will want to use the painting metaphor in other input areas than applying color to a surface, such as to change related surface attributes.

What is needed is a way of using "painting" to input other types of data.

In the past changing attributes related to a surface using 3D paint systems has been done by associating color with the attribute being modified. For example, a gray-scale value is used to denote how rough the surface is where black is perfectly smooth and white is very bumpy. For simple scalar values, this approach was usable but non-intuitive. For more complex multi-channel attributes, the limitations of this approach become evident. A new generation of 3D paint system is now available where attributes other than color are being "painted" onto the surface. Some examples would be complex surface sculpting or "painting" the flabbiness of skin and seeing immediate feedback of these actions. Since there are a potentially unlimited number of surface related attributes that artists may wish to modify, it is inevitable that they will come across an attribute that they wish to "paint" that isn't directly supported by the 3D paint program. To solve this problem, artists have often requested the designers of 3D paint programs to provide a special capability for a particular specialized need. To do this the program designers have hard coded the special capability into the 3D paint program. If the special capability is only required for a single project, this approach can be very expensive and time consuming. This approach can also require the paint program designers to anticipate all the possible uses for the painting technology.

What is needed is a system that will allow a user to paint surface related attributes without requiring that the capability be hard coded into the 3D paint program. In other words, a system is needed that will allow users (and even 3D paint program developers) to use a 3D paint style graphical interface for the application of changes to surface based attributes that were not anticipated by the design of the typical 3D paint program.

SUMMARY OF THE INVENTION

It is an object of the present invention to provide a system that will allow a 3D paint program to be customized to use the paint interface for inputting characteristics other than texture.

It is another object of the present invention to provide a system that activates special painting capabilities continuously during the paint strokes by a painting tool.

It is also an object of the present invention to provide a flexible way of making changes to a 3D paint program.

It is a further object of the present invention to provide a user customizable painting interface that allows the user to specify attributes to be painted.

The above objects can be attained by a system that allows a user to specify dynamic three-dimensional (3D) painting using a continuous, loosely-coupled control flow for the painting process. The system attaches user customizable actions to the act of painting on 3D surfaces in a computer based graphics system. The actions can be created independently of the 3D painting architecture. The customizable actions are in'the form of scripts that the user can provide and which are interpreted during painting actions. The scripts allow the user to paint attributes of surfaces or input other data using a paint style graphical user interface that includes tools, such as brushes, and actions such as setting all the attributes associated with the entire surface or a sub-region of the surface with a single value or values.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS:

The present invention allows a user to customize the input or modification of data to a three-dimensional (3D) paint program, such as the input of attributes associated with a surface of a 3D model. The customization is provided by user created, script based procedures that are executed substantially continuously as paint strokes are made on a 3D surface with a paint style graphical user interface. The attributes can be attributes of the actual painted surface, such as the "stretchiness" of the surface, or attributes of objects associated with the surface, such as the size of smoke particles emitted "from" the surface, or the existence of objects themselves.

During operation, the script specifies which attributes associated with a surface are to be modified. The paint engine paints the surface based on tool strokes where the tool has parameter values that are associated with each stroke. The engine provides the values of the attributes of the points of the surface encountered by the tool strokes to the script. The script then sets those values of the attributes for those points painted by a stroke. If the attribute being changed is the height of a tree, then the height of all trees touched by a tool stroke are set to the desired parameter value, thereby changing the height of the trees associated with the surface being painted.

Figure 1:
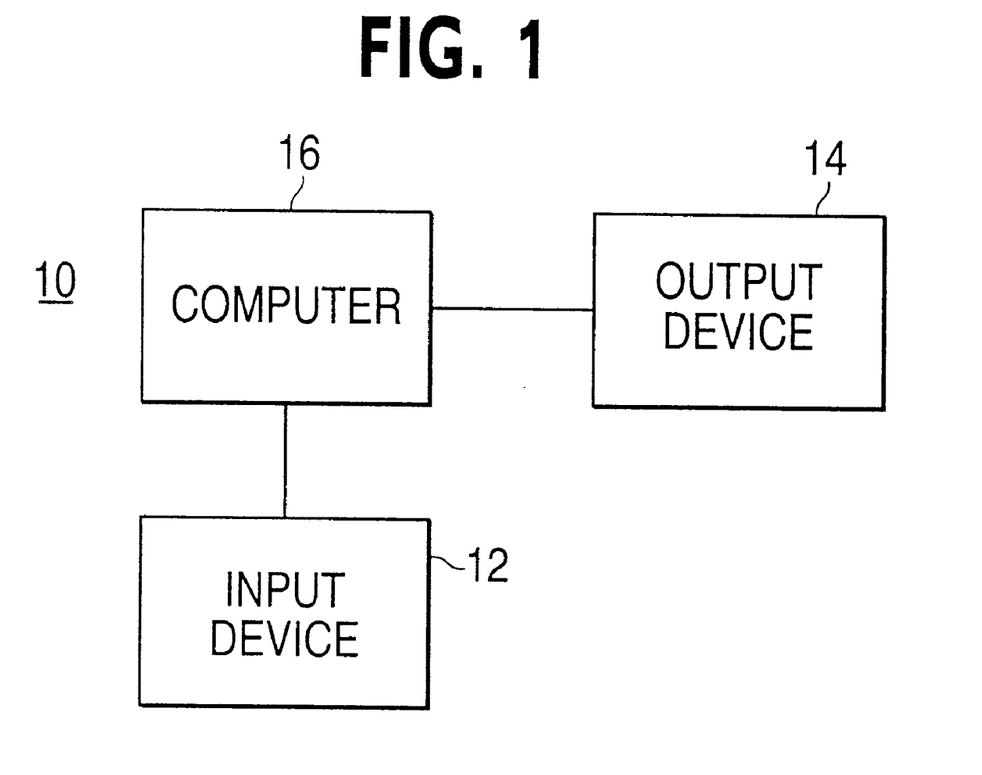
FIG. 1 illustrates a system according to the present invention.

The present invention is typically implemented in a system 10, as depicted in FIG. 1, which includes an input device 12 typically used with a paint style graphical user interface. This input device 12, can be a tablet/stylus, a mouse, a joystick, and any other input device that can be used to "paint" a surface of a computer based model. The model, and any changes to the model performed by custom painting according to the invention, can be displayed or output onto an output device 14, which could be a CRT type display, a printer, an image database server, a network, and any other output device suitable for outputting 3D surfaces. A computer 16, such as an O2 workstation from Silicon Graphics, Inc. (SGI) interacts with the user through the input device 12 to change the model and output it for viewing to the output device 14. The computer 16 also includes storage media (hard disk, floppy disk, CD ROM, RAM, ROM, etc.) For storing the process of the present invention as well as the capability of communicating the inputs, outputs, processes, models, etc. over a network, such as the Internet.

The computer 16 executes a paint program, such as Maya Artisan available from SGI, that includes a painting graphical user interface usable with an input device 10, such as previously mentioned. It is preferable that the paint program be a 3D paint program such as Maya Artisan. The paint program also needs to have the capability of allowing the user to provide procedures to the paint program that are not in the original paint program. Paint programs can provide such a capability through a mechanism such as an interpreted language like Maya Embedded Language (MEL) found in the Maya 3D Animation system from SGI (Maya Artisan is a module within Maya). As a result, the user needs to be familiar with and capable of producing procedures in such an interpreted language.

The present invention includes several points during the execution of a painting engine, such as Maya Artisan, where calls to a script (actually calls to interpret a script) can be made. An engine, such as Maya Artisan, is modified to make calls at these points. At each of the points the user can provide a script that allows the painting process to be customized. As an example, we will assume that the user wants to "paint" cones onto the surface of a model and allow the "painting" of an attribute of the cones, particularly the height of the cones. The example scripts supplied in the Appendix are ones that can be interpreted by MEL. The scripts are typically placed in a scripts directory and given a name, such as ConePaint, in the example provided herewith. Once the scripts are available, the user selects a paint tool and sets the parameters of the tool, such size and shape of a brush, and particularly, the value which will be applied when script painting is performed. In the present example, the height or y-scale value is set. Additional parameters that can be set and which will affect the value painted via the script are offset which changes the range of value applied to a brush with a tapered shape, opacity which defines the fraction of the value to apply as brush strokes overlap, a multiplier which sets the factor that value should be multiplied by as well as a valid range for the values. The user can also specify how the painted values will affect the existing attribute values. For example the user could choose to replace the attribute values with the painted values, add the painted values to the attribute values, scale the attribute values by the painted values or even replace the attribute value with an average of the surrounding values to give a smoothing affect. The user also selects or designates that the painting will be script based and designates the script by name. The user then paints the geometry as desired. If during the painting the user wants to change the attribute the user need only change the characteristics of the paint. For example, the user can change the height of the cones by changing the height "value" set or painted by a feathered brush and paint over the cones to change their heights without having to select each cone separately and manually adjust the height of each cone as would be required in the prior art where special hard coded procedures are not provided.

Figure 2A:
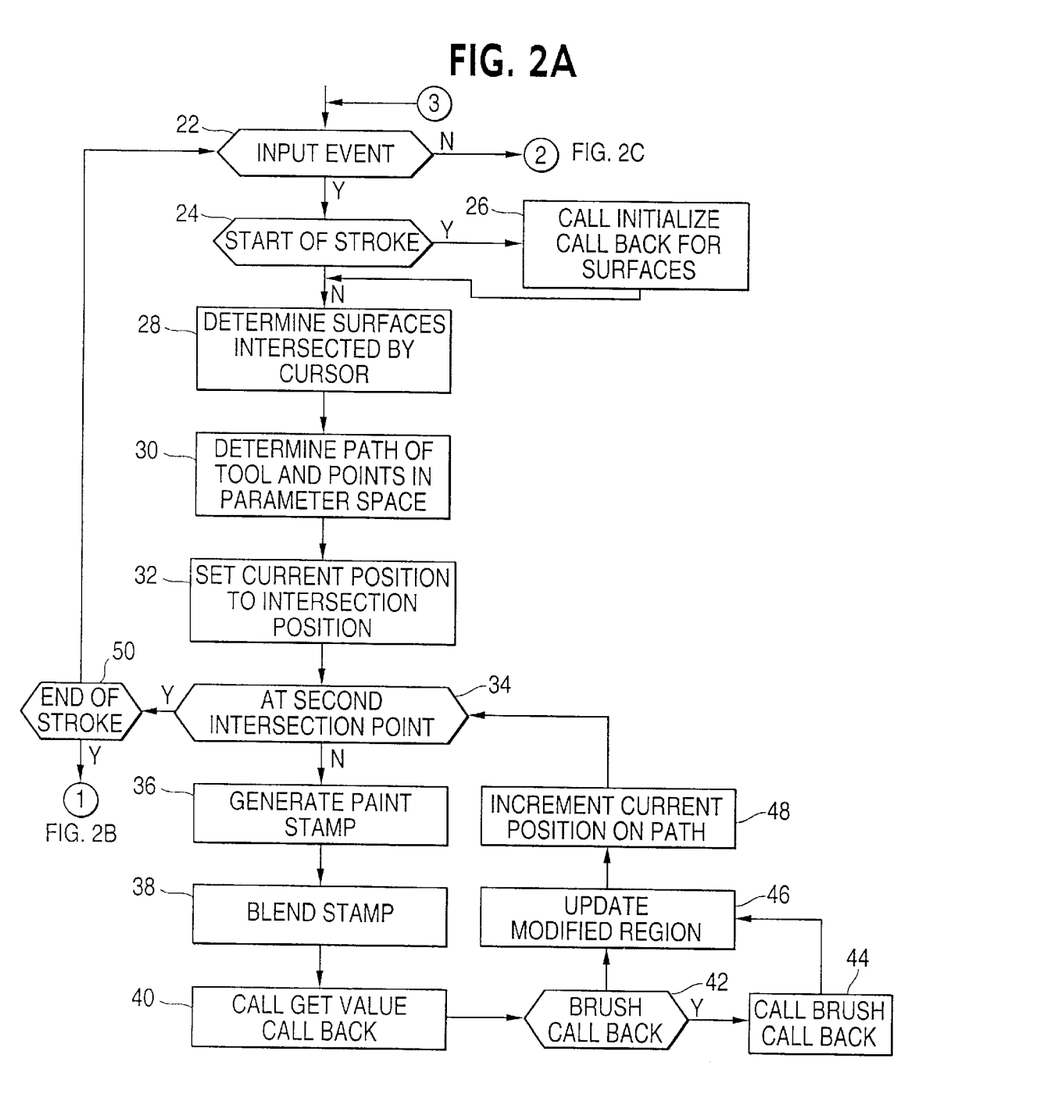
FIGS. 2A–2C depict the flow of operations according to the present invention.

The present invention operates in a loop in which input device events, such as mouse events when the input device is a mouse, trigger event based processing. As illustrated in FIG. 2A, when an input event occurs 22, a determination is made 24 as to whether the event is the start of a stroke. If so, the engine is modified to allow a call 26 to interpret an initialization script. An initialization callback script for the cone height example is provided in the Appendix included herewith. This initialization call back can allow the user to not only set the painting grid as shown in the Appendix, but to also specify to the painting engine what data to provide when a script is to be executed, such as cursor location, 3D position data, 2D parameter space position, surface normal, surface tangents, brush direction, etc.

Next, the engine determines 28 the surfaces of the model that are intersected by the cursor or paint tool. This is done by projecting a line perpendicular to the view through the model and determining the surfaces intersected by that. From the intersection, the surface and a 3D point of the surface can be determined. The normal and the tangents to the surface at this point can also be determined. These values can be important to determining which attributes of a surface are affected by the painting of the present invention. For each point on the 3D surface of a model there exists a corresponding point on a 2D-parameter surface or matrix where the parameter values for that 3D surface point are stored. The engine uses the intersection points for the 3D surface to determine the corresponding points in the 2D parameter space that need to be changed.

Figure 3:
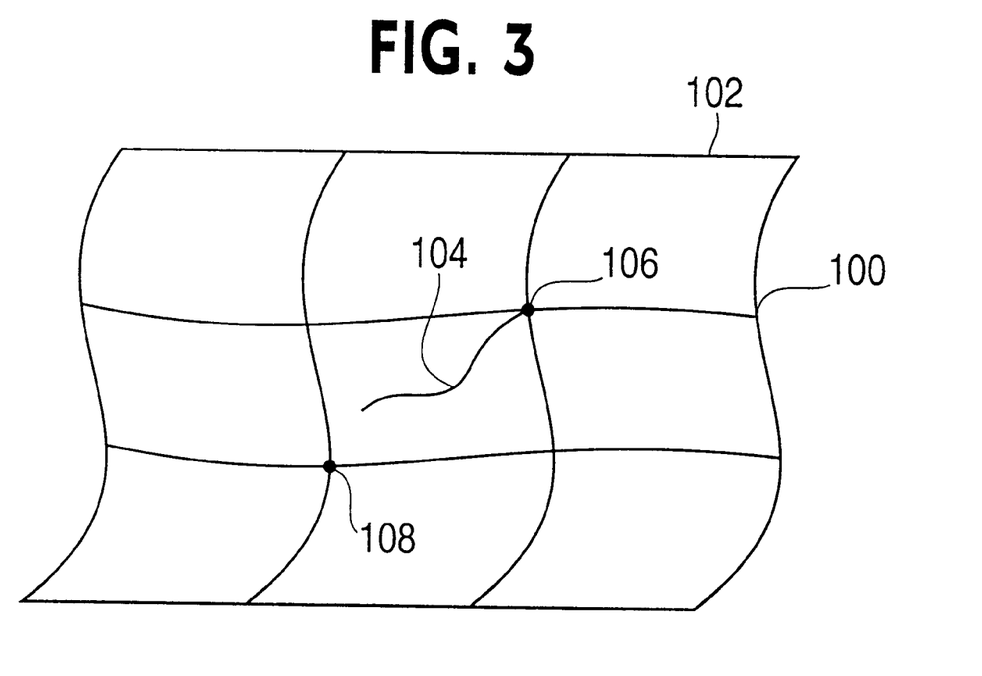
FIG. 3 illustrates a surface overlaid with a grid that is used to initiate stamp processing.

The 3D surface is divided into sections by a grid 100 as depicted in FIG. 3. This grid defines intersection points between which a line 104 can be drawn. The line 104 starts at a first intersection point 106 and will encounter a second intersection point 108. The system determines 30 the path of the line from the first intersection point 106 toward the second intersection point 108 in the 2D-parameter space. That is, the points in the 2D-parameter space, where brush stamps will be placed to create the impression of a continuous brush stroke, are determined.

The system then sets 32 the current position to the first intersection point 106. The system then determines 34 whether the current position has reached the second intersection point. If so, a loop back for another input event is performed. If not, a stamp is generated 36 by the engine at the current position and the stamp is blended 38 by the engine with any previously generated stamps that were placed at or near this position.

After the stamp is generated, a call 40 to another script that the user has provided is performed. This is a call to get all the values of the designated attributes that are being changed by painting for every point that the brush stamp is being blended into. In step 38, the stamp is blended into the surface while in step 40, all the attributes that will be affected by the blending of this stamp into the surface are obtained. A sample of a script for the cone attribute painting example is set forth in the Appendix. The example particularly gets the height (y scale factor) for each cone. This call could be written to retrieve any other attribute that needs to be modified. For example, if the engine is producing smoke particles, the attribute could be for the radius of the smoke particles emitted by an emitter.

At this point, the system could call a set value script which would set the new value for all of the points that have been affected by the brush stamp. For anything but very fast systems or very simple models and/or surface attributes, this would be too burdensome to the system. In most cases, the actual attribute changes are made during a "wait" period between input events as will be discussed with respect to FIG. 2C. Since input events occur many times a second, the attribute changes will still appear to be updated to the user in real-time.

The system then determines 42 whether there is a brush callback and makes 44 a call if necessary. This call back is used if the script requires knowledge of the actual path taken by the brush stamp. The engine then updates 46 the modified region of the surface and increments 48 the current position along the tool path. This loop continues until stamps are applied between the two intersection points.

If the second intersection point 108 on the grid has been reached (34) the engine determines 50 whether the end of the stroke has been reached by, for example, the release of a mouse button. If not, the loop back for input events continues. If so, the system determines 52 (see FIG. 2B) whether any area of the surface has changed since the last update. If so the changed area is obtained 54 and a call or calls to the set value script is made 56, an example of which is set forth in the Appendix. This script sets the values of the attributes associated with the surfaces that are being painted. This causes the values of the attributes associated with the surface to be changed. If the changes in the attribute values would cause a change of what appears on the display, the display will also update at this point. In the example of the Appendix, the height of the cones is changed. Additional information that could be passed to the set value script or command includes (but is not limited to): a) surface position (both in local and world space); b) surface normal (both in local and world space); c) surface u tangent (both in local and world space); d) surface v tangent (both in local and world space); e) surface position in parameter space (u,v); f) brush direction (in parameter space (du,dv) as well as in local or world space) as well as brush speed and acceleration; g) color (r,g,b).; h) second order surface derivatives (i.e. rate of change of tangents) which could be used to give an indication of how smooth the surface is at that point; and i) topology information (i.e. what surfaces are connected to this surface).

Figure 2B:
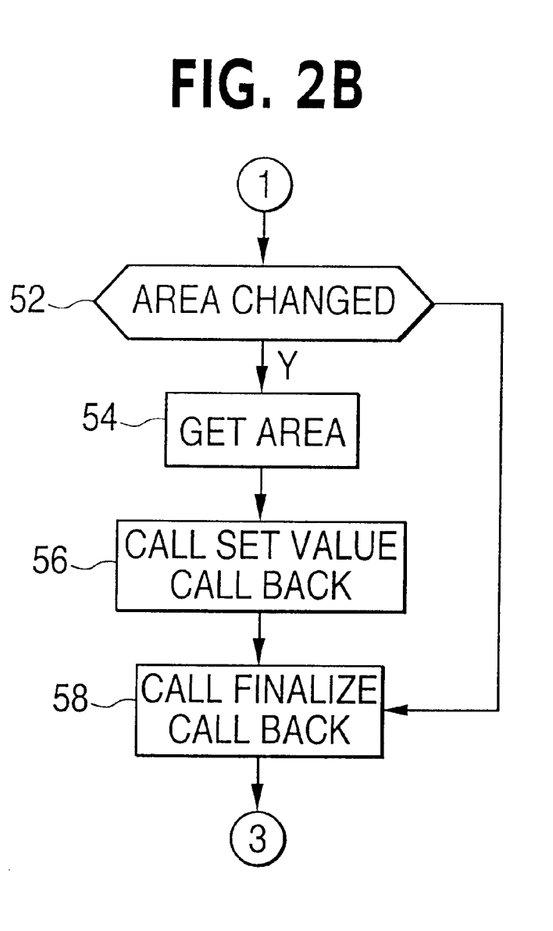

Then, the engine calls 58 a finalize callback such as set forth in the Appendix. This script contains any "cleanup" actions required at the end of the stroke, such as releasing resources that were used or allocated by the various scripts during the stroke. Once the finalize call back is performed the engine waits for another stoke of the paint tool to start.

Figure 2C:
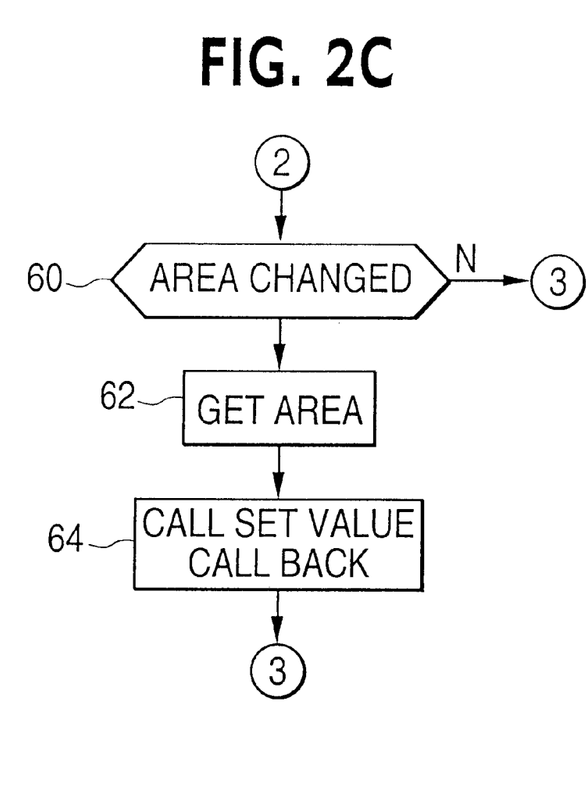

When the system is waiting for input events (22) a similar update to that discussed above is performed. First, as depicted in FIG. 2C, a determination 60 is made as to whether any areas of the surface have changed since the last update. If so, the area is obtained 62 and the set value callback script is called 64. Once the changes are made the flow returns to waiting for input events.

Other actions that are commonly associated with "paint" programs can be handled by the present invention. For example, it is often convenient, to "clear" the entire surface or a sub-region of the surface to a specified value. This can be thought of like using a very large brush of the appropriate size and shape and placing a single stamp on the surface such that the brush stamp covers the desired area. In the cone example, clearing the surface to a specific value will make the height of all the cones on the surface the same. Another common painting action that can be handled by this invention is importing values in the form of image files and using these values to modify the attribute values. Once again this can be thought of like using a very large brush of the appropriate size and shape and using the imported values as the "texture"that will be used by the brush.

Figure 4:
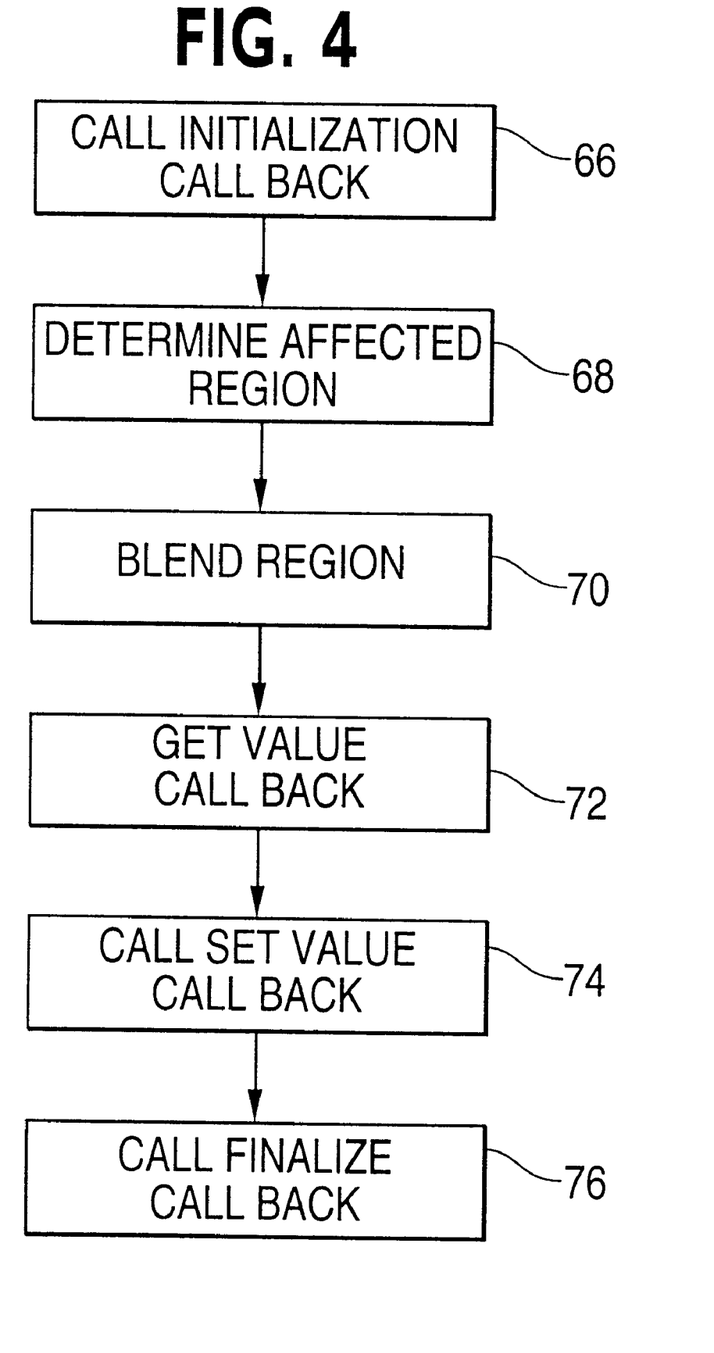
FIG. 4 illustrates another flow of operations according to the present invention.

In the above cases, the engine would operate in a manner as depicted in FIG. 4. An initialization callback is called 66 which fulfills the same purpose as the initialization callback 26 in FIG. 2A. Then the region of the surface to be affected by the new values is determined 68. The new set of values are then blended 70 into the existing values using the get value callback 72 to determine the existing values. This is similar to steps 38 and 40 in FIG. 2A. Once the painting engine determines the new values, the set value callback 74 is called for all the altered values. Then, the finalize callback is called 76 which carries out the same actions as 58 in FIG. 2B. The exact same scripts as outlined in the Appendix can be used.

The embodiment described above involves the use of scripts that directly change the attributes associated with a surface. Such scripts need to be rather detailed as can be seen from the example provided in the Appendix and because they are continuously interpreted, the overhead can be burdensome. It is also possible, as an alternative, to take advantage of powerful graphics control entities called dependency graphs and particularly the dependency nodes found with such a graph, which are described in the related application previously mentioned. A dependency node is an object that can include data associated with it. For example, a hair node can include an array of numbers that represent the length of the hair. To modify the data associated with a node, the script supplies the name of the data that is to be modified. The engine determines where the data is located from the name and goes directly to the node and modifies the data. In the Maya 3D Animation system from SGI, such nodes can be custom-made by the user. This approach is much faster than using a full script since these dependency nodes are written using a compiled language such as C++ as opposed to an interpreted language such as MEL. Suppose there was a special dependency node that was associated with a surface and would place cones onto the surface. The height of the cones could be controlled by an array of numbers associated with this dependency node. In this embodiment a get node data callback, such as set forth in the Appendix, would be all that is required to adjust the height of the cones of the above-discussed example.

The present invention has been described with respect to painting attributes associated with a painted surface. It is also possible for the painting to: a) paint arbitrary geometry along a surface and control various aspects of the painted geometry; b) paint particle emitters onto a surface and control various aspects of the emitters as well as the particles emitted by the emitters; c) paint how well the "skin" binds to the "muscle" underneath it (i.e. flabbiness); d) selectively morph one surface into another by painting the portions of the surface that should morph into the other surface; e) paint attributes of a piece of computer generated cloth (for example, painting the cloth tension would be the analog of starch in real clothing); f) paint which portions of the surface that represents skin correspond to particular joints in a skeletal system that will be used to animate the surface; g) paint friction on a surface in a rigid body dynamics system;

h) paint spring characteristics of springs attached to the control points of a surface; and i) paint how much each point on the surface is influenced by a 3D transformation. As can be seen, the number of applications of the 3D painting metaphor is very large and limited only by the capabilities of the system containing the painting engine.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

```
Initialize Callback
//These are global variables used to keep track of
//multiple surfaces and the name prefixes used for
//the cones on each surface.
//
global string $coneNamePrefix [ ] ;
global int $conePaintFreeSlot = 0;
global int $conePaintSlots = 0;
//
//conePaint is the procedure that initializes the
//tool by telling it what procedures should be
//called under various circumstances.
//This procedure should be set as the
//"Tool Setup Command" in the
//Setup tab of the Maya Artisan Script Paint
//tool's tool settings window. The tool context
//is supplied as an argument.
//
global proc conePaint ( string $context )
{
//
//initialize all the other commands in this
//scriptable paint tool context.
//
    userPaintCtx -e
        -ic "initConePaint"
        -fc "finishConePaint"
        -svc "setConePaintValue"
        -gvc "getConePaintValue"
        -gsc " "
        -cc " "
        -tcc " "
        -gac " "
        $context;
}
//
//This is the "Initialize Command". This
//procedure is called once for every
//selected surface when an initial
//click is received on any surface.
//The argument is the name of the surface.
//This procedure returns a string which indicates
//to the scriptable tool how to behave
//for the duration of the stroke.
//
global proc string initConePaint ( string $name )
{
    global string $coneNamePrefix [ ] ;
    global int $conePaintFreeSlot;
    global int $conePaintSlots;
    int $slot;
//
//The first thing to do is determine a surface
//ID to associate with this surface.
//This is done by going through the
//$coneNamePrefix array, looking for
//the first free entry. Once it finds an entry,
//the entry index is used as the surface ID ($slot).
```

APPENDIX-continued

```
//Find a free slot for this surface in the global
//arrays.
//
    for (
        $slot = $conePaintFreeSlot;
        $slot < $conePaintSlots;
        $slot++
    )
    {
        if ( $coneNamePrefix [$slot] == " " ) {
            break;
        }
    }
    if ( $slot == $conePaintSlots )          {
        $conePaintSlots++;
        $conePaintFreeSlot = $conePaintSlots;
    }
//
//The next thing to do is determine whether
//the passed in $name corresponds to a surface.
//If it does, a prefix is generated for the
//painted cones and stored into the appropriate
//entry in the $coneNamePrefix array.
    if ( 'nodeType $name ' == "surface" ) {
//Save the name of the parent of this shape
//as well as a prefix to use when creating
//the cones.
//
        string $parent [ ] = 'listRelatives -p $name';
        $coneNamePrefix [$slot] = $parent [0] + "Cone";
    }
//
//The final function for the initialize procedure.
//is to return a string which indicates to engine
//how to handle this surface. The string is a
//sequence of special flags and their arguments as
//described earlier. In this case, the string
//includes flags telling the engine;
//1.what surface ID should be used for this surface
//2.that painting should occur on a 20x20 grid
//evenly spaced in the surface's parameter space
//3.that the world space position should be passed
//to setConePaintValue whenever it is called.
//4.that the object space normal should be passed to
//setConePaintValue whenever it is called.
//It return an argument string which:
//a. tells the tool what surface ID to use for this
//surface
//b. indicates that values should be distributed on
//a 20x20 grid on the surface
//c. indicates that the associated world space
//position should also be passed to the
//"Set Value Command".
//d. indicates that the associated object space
//normal should also be passed to the
//"Set Value Command".
//
        return ( "-id " + $slot
            + " -grid 20 20"
            + " -position world"
            + " -normal local");
}
Get Value Callback
//This is the "Get Value Command". It is called
//every time a value on the surface is needed
//by the scriptable paint tool. A
//surface ID and a grid index is passed in. This
//procedure should return the value for this
//grid location on the specified surface.
//
global proc float getConePaintValue ( int $slot, int
    $index )
{
        global string $coneNamePrefix [ ] ;
        if ( $coneNamePrefix [$slot] != " " ) {
//
// If this slot is valid, generate the name for the
// cone at this grid index.
//
```

APPENDIX-continued

```
                string $objname = $coneNamePrefix[$slot  ]
                                + $index;
//
//This procedure is called whenever the engine
//needs a value corresponding to a specific
//grid location. In this script, the values are
//the cone's Y scale factor.
//
                if ( 'objExists $objname' ) {
//
//If a cone has been painted at the location
//referenced by $index, then the cone's Y scale
//factor is returned.
//If the cone exists, return the Y scale factor
//as the value for this grid location.
//
                        return 'getAttr ($objname + ".sy") ';
                } else {
//
//If there is no cone at this location, just
//return 0.0 as the value for this location.
//The cone doesn't exist, therefore return 0 as
//the value for this grid location
//
                        return 0.0;
                }
        } else {
                return 0.0;
        }
}
Set Value Callback
//This is the "Set Value Command." It is called
//every time a value on the surface is
//changed. A surface ID, a grid index
//on the surface and the value associated with that
//grid index is passed. There can be additional
//arguments depending on the options generated
//by the return value of the "Initialize
//Command".
//In this case the (x,y,z) surface position
//for this grid point as well as the
//(nx, ny, nz) surface normal is also passed.
//
global proc setConePaintValue (
        int $slot,
        int $index,
        float $val,
        float $x,
//
// ($x, $y, $z) is surface position
//
        float $y,
        float $z,
        float $nx,
//
// ($nx, $ny, $nz) is surface normal
//
        float $ny,
        float $nz
)
{
        global string $coneNamePrefix [ ];
//
//Determine if $slot is a valid surface ID
//by checking if the corresponding entry in
//$coneNamePrefix is not the empty string.
//
        if ( $coneNamePrefix[$slot] != " " ) {
//
//All the painted cones have a unique name
//which combines the $coneNamePrefix for this
//surface plus the grid index. This is how this
//script determines whether something has already
//been painted at this location.
//Determine the name of the cone associated with
//this grid location.
//
                string %objname = $coneNamePrefix[$slot]
                                + $index;
```

```
                if ( 'objExists $objname' ) {
//
//In this case the cone already exists. Therefore
//the passed value, $val, is used as the Y scale
//factor for the cones (default cones are
//oriented along the Y axis so scaling in Y
//changes the height of the cone). As a special
//case, if the value is less that or equal
//to 0, the corresponding cone is removed.
//If the cone already exists, use the value to
//adjust the Y scale (i.e. height) of the cone.
// If the value is 0, the cone is deleted.
//
                        if ( $val > 0 ) {
                                scale 1.0 $val 1.0 $objname;
                        } else {
                                delete $objname;
                        }
                } else if ( $val > 0 ) {
//
//In this case, there is no painted cone
//corresponding to this grid location.
//Create a cone using the cone MEL command
//using the -name option to give the newly
//created cone the desired name. Once the cone
//is created, change the cone's Y scale factor
//to the passed in value ($val). At this point
//the cone is also positioned so that it will
/appear at the right place by moving it from
//the origin (this is where cones are created by
//default) to the world space position that was
//passed into this procedure ($x,$y,$z).
//It will also be oriented along the surface
//normal at this point so that the cone looks
//like it is sitting on the surface.
//
                        string $sname [ ] ;
//
//Create a cone with the proper name, scale it by
//the passed value
//
                        $sname= 'cone -ch off -name $objname';
                        if ( $sname[0] != $objname ) {
                                print ("CONE NAME FAILED: wanted "
                                        + $objname + " got " +
                                        $sname[0] + "\n");
                        }
                        scale 1.0 $val 1.0;
//
//Orient the cone along the surface normal
//- calcRotation(fx,fy,fz,tx,ty,tz,rx,ry,rz )
// is a function that calculates the rotation
//(rx,ry,rz) around the 3 major axes required
//to rotate the vector (fx,fy,fz) such that it
//is parallel with the vector (tx,ty,tz)
//- this is standard linear algebra and hasn't been
// included here.
//- we use this function to determine the required
// rotation necessary to bring the Y-axis (0,1,0)
// parallel to the surface normal
//
                        float $rx, $ry, $rz;
                                calcRotation( 0, 1, 0, $nx, $ny, $nz,
                                        $rx, $ry, $rz ) ;
                        rotate $rx $ry $rz;
//
//Move the cone to the surface position.
//
                        move $x $y $z;
                }
        }
}
Finalize Callback
//This is the "Finalize Command". This procedure is
//called at the end of the stroke.
//It is passed the surface ID, that was
//generated by the "Initialized Command".
//
global proc finishConePaint ( int $slot )
```

APPENDIX-continued

```
{
//
//This is called at the end of the stroke.
//Use $slot to clear out this surface's
//corresponding entry in $coneNamePrefix. Also
//update $conePaintFreeSlot with $slot, if
//$slot is earlier in the array.
//
        global string $coneNamePrefix [ ];
        global int $conePaintFreeSlot;
//
//Clear out the slot that was used for this
//surface
//
        $coneNamePrefix[$slot] = " ";
        if ( $slot < $conePaintFreeSlot )
            {
            $conePaintFreeSlot = $slot;}
}
Cone Paint by modifying dependency node data
global proc conePaint ( string $context )
{
        // Initialize all the other commands in this
        // scriptable paint tool context. To paint
        // array attributes, you have to supply a
        // procedure that will return the full name
        // of the array attribute you wish to paint.
        // Most of the other commands are ignored in
        // this case; therefore they are set to the
        // empty string.
        //
        userPaintCtx -e
                -tcc " "
                -ic " "
                -fc " "
                -svc " "
                -gvc " "
                -cc " "
                -gsc " "
                -gac ("getConePaintAttr " + $attr)
                $context;
}
// This is the "Get Array Attribute Command". The
// scriptable paint tool also supplies the name of
// the surface that is being painted. This
// procedure should return one (or more) fully
// qualified name(s) of attribute array(s) to
// be painted.
//
global proc string getConePaintAttr(
        string $name
)
{
        string $fullAttr = " ";
        if ( 'nodeType $name' == "nurbsSurface" ) {
                string $connections [ ];
                string $connection;
                $connections = 'listConnections -sh true
                                $name';
                for ( $connection in $connections ) {
                        if ( $connection != " "
                                && 'nodeType $connection'
                                == "cones" ) {
                                int $usamples =
                                        'getAttr ( $connection
                                                + ".uSamples")';
                                int $vsamples =
                                        'getAttr ( $connection
                                                + ".vSamples")';
                                $fullAttr = ( "-grid "
                                        + $usamples + " "
                                        + $vsamples + " "
                                        + $connection
                                        + ".height" );
                        }
                }
        }
        return $fullAttr;
}
```

What is claimed is:

1. A process, comprising:

executing a painting process for a three-dimensional surface representation; and performing user specified modifications of attributes associated of the surface during the painting, the modifications being specified by a user generated script interpretable by the painting process, wherein the script comprises an initialization script specifying what attributes will be modified, a get value script obtaining the attributes for the painting process and a set value script setting the attributes to a value set by the painting process and wherein the script is interpreted continuously during painting strokes made by the user.

2. A process as recited in claim 1, wherein the attributes are one or more numeric values which can continuously vary between a user specified minimum and maximum value.

3. A process as recited in claim 1, wherein the modification sets all attributes associated with a region of the surface to a value.

4. A process as recited in claim 1, wherein the attribute values indicate whether an object exists associated with the surface.

5. A process as recited in claim 1, wherein plural attributes are modified at a same time.

6. A process, comprising:

executing, using a painting engine, a user specified, interpreted initialization procedure specifying attributes related to a surface of a three-dimensional surface being painted at a beginning of a paint stroke;

painting paint stamps on the surface responsive to the stroke using the painting engine, the painting including a parameter value;

executing a user specified, interpreted get procedure obtaining the specified attributes; and executing a user specified, interpreted set procedure setting the specified attributes responsive to the parameter value.

* * * * *

UNITED STATES PATENT AND TRADEMARK OFFICE
CERTIFICATE OF CORRECTION

PATENT NO.   : 6,549,212 B1  Page 1 of 1
DATED        : April 15, 2003
INVENTOR(S)  : Ronald Janzen It is certified that error appears in the above-identified patent and that said Letters Patent is hereby corrected as shown below:

<u>Column 2,</u>
Line 17, delete "in'" and insert -- in --

Signed and Sealed this

Fifteenth Day of July, 2003

JAMES E. ROGAN
*Director of the United States Patent and Trademark Office*